United States Patent
Craddock et al.

(10) Patent No.: US 9,483,436 B2
(45) Date of Patent: *Nov. 1, 2016

(54) PCI FUNCTION MEASUREMENT BLOCK ENHANCEMENTS

(71) Applicant: International Business Machines Corporation, Armonk, NY (US)

(72) Inventors: David Craddock, New Paltz, NY (US); Beth A. Glendening, Poughkeepsie, NY (US); Thomas A. Gregg, Highland, NY (US); Dan F. Greiner, San Jose, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 51 days.

This patent is subject to a terminal disclaimer.

(21) Appl. No.: 14/501,388

(22) Filed: Sep. 30, 2014

(65) Prior Publication Data

US 2015/0261716 A1 Sep. 17, 2015

Related U.S. Application Data

(63) Continuation of application No. 14/211,093, filed on Mar. 14, 2014.

(51) Int. Cl.
*G06F 13/42* (2006.01)
*G06F 13/28* (2006.01)

(52) U.S. Cl.
CPC ............ *G06F 13/4221* (2013.01); *G06F 13/28* (2013.01)

(58) Field of Classification Search
CPC ............................ G06F 13/28; G06F 13/4221
See application file for complete search history.

(56) References Cited

U.S. PATENT DOCUMENTS

| | | | |
|---|---|---|---|
| 6,948,164 B2 | 9/2005 | Tinker | |
| 7,210,118 B2 | 4/2007 | Hastings | |
| 7,496,707 B2 | 2/2009 | Freking et al. | |
| 8,615,645 B2 | 12/2013 | Craddock et al. | |
| 8,650,335 B2 | 2/2014 | Brice, Jr. et al. | |
| 2011/0320643 A1 | 12/2011 | Brice, Jr. et al. | |
| 2011/0320644 A1 | 12/2011 | Craddock et al. | |
| 2011/0320758 A1* | 12/2011 | Craddock | G06F 12/0292 711/206 |
| 2011/0320772 A1* | 12/2011 | Craddock | G06F 9/30003 712/205 |
| 2011/0321061 A1* | 12/2011 | Craddock | G06F 9/4812 719/318 |

* cited by examiner

*Primary Examiner* — Nimesh G Patel
(74) *Attorney, Agent, or Firm* — Cantor Colburn LLP; Steven Chiu

(57) ABSTRACT

Embodiments relate to an enhancement of a function measurement block. An aspect includes obtaining common statistics from a function table. An aspect includes obtaining adapter-specific statistics from an adapter. An aspect includes providing the common statistics and the adapter-specific statistics in the function measurement block. An aspect includes providing adapter-specific counters in the function measurement block.

12 Claims, 8 Drawing Sheets

PCI FUNCTION MEASUREMENT BLOCK ENHANCEMENTS

DOMESTIC PRIORITY

This application is a continuation of U.S. patent application Ser. No. 14/211,093, filed Mar. 14, 2013, the disclosure of which is incorporated by reference herein in its entirety.

BACKGROUND

The present invention relates generally to computing technology, and more specifically, to peripheral component interconnect (PCI) function measurement block enhancements.

Data regarding the performance of PCI functions attached to a processor (e.g., an IBM z-series processor) are gathered or obtained during the normal operation of the PCI function. The data may be inspected by an Operating System (OS) using a function measurement block (FMB), the location of which is established by a "modify PCI function controls" (MPCIFC) instruction.

The FMB may include a number of fields. For example, a "format" field is included that is one-byte and indicates a format of the remaining fields. A "sample count" field is a 32-bit binary integer that is incremented whenever any of the following fields is updated. A "PCI-load operations" field is a 64-bit binary integer that is incremented each time a PCILG instruction completes with a condition code of zero (0). A "PCI-store operations" field is a 64-bit binary integer that is incremented each time a PCISTG instruction completes with a condition code of zero (0). A "PCI-store-block operations" field is a 64-bit binary integer that is incremented each time a PCISTB instruction completes with a condition code of zero (0). A "refresh-PCI-translations operations" field is a 64-bit binary integer that is incremented each time a RPCIT instruction completes with a condition code of zero (0). A "DMA read/write counters" field represents pairs of 64-bit binary integer counters that are incremented by one for each transfer operation, e.g., a transfer comprising a full or partial 32-byte block.

In further iterations, the FMB described above may be amended to include a "validity indication" field that is a one-bit value indicating whether the DMA read/write counters contain valid numbers. The FMB may include a "time of last update" field that is a 63-bit field indicates the time of the last update of the PCI FMB. The time of last update field has the same format as bits 0-62 of a time-of-day (TOD) clock used by a central processing unit (CPU) and follows the sample count field described above. The FMB may include an "update-in-progress" field that is a 1-bit field that is set when the PCI function begins the process of updating the various counters in the FMB and is reset to zero when the update process has completed. The update-in-progress field immediately follows the time of last update field, and thus, the two fields form a doubleword-aligned 64-bit value.

SUMMARY

Embodiments include a method, system, and computer program product for enhancing a function measurement block. In an embodiment, a method comprises obtaining, by a processor, common statistics from a function table. The method comprises obtaining, by the processor, adapter-specific statistics from an adapter. The method comprises providing, by the processor, the common statistics and the adapter-specific statistics in the function measurement block. The method comprises providing adapter-specific counters in the function measurement block.

In an embodiment, a computer program product for enhancing a function measurement block is provided. The computer program product comprises a computer readable storage medium having program instructions embodied therewith. The program instructions are readable by a processing circuit to cause the processing circuit to perform a method. The method comprises obtaining, by a processor, common statistics from a function table. The method comprises obtaining, by the processor, adapter-specific statistics from an adapter. The method comprises providing, by the processor, the common statistics and the adapter-specific statistics in the function measurement block. The method comprises providing adapter-specific counters in the function measurement block.

In an embodiment, a computer system for enhancing a function measurement block is provided. The computer system comprises a memory having computer readable instructions. The computer system comprises a processor configured to execute the computer readable instructions. The instructions comprise obtaining common statistics from a function table. The instructions comprise obtaining adapter-specific statistics from an adapter. The instructions comprise providing the common statistics and the adapter-specific statistics in the function measurement block. The instructions comprise providing adapter-specific counters in the function measurement block.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

In accordance with one or more embodiments, systems, apparatuses, and methods are described that provide for alternate formats of a peripheral component interconnect (PCI) function measurement block (FMB) containing information that is germane to a PCI function type that is attached.

Figure 1:
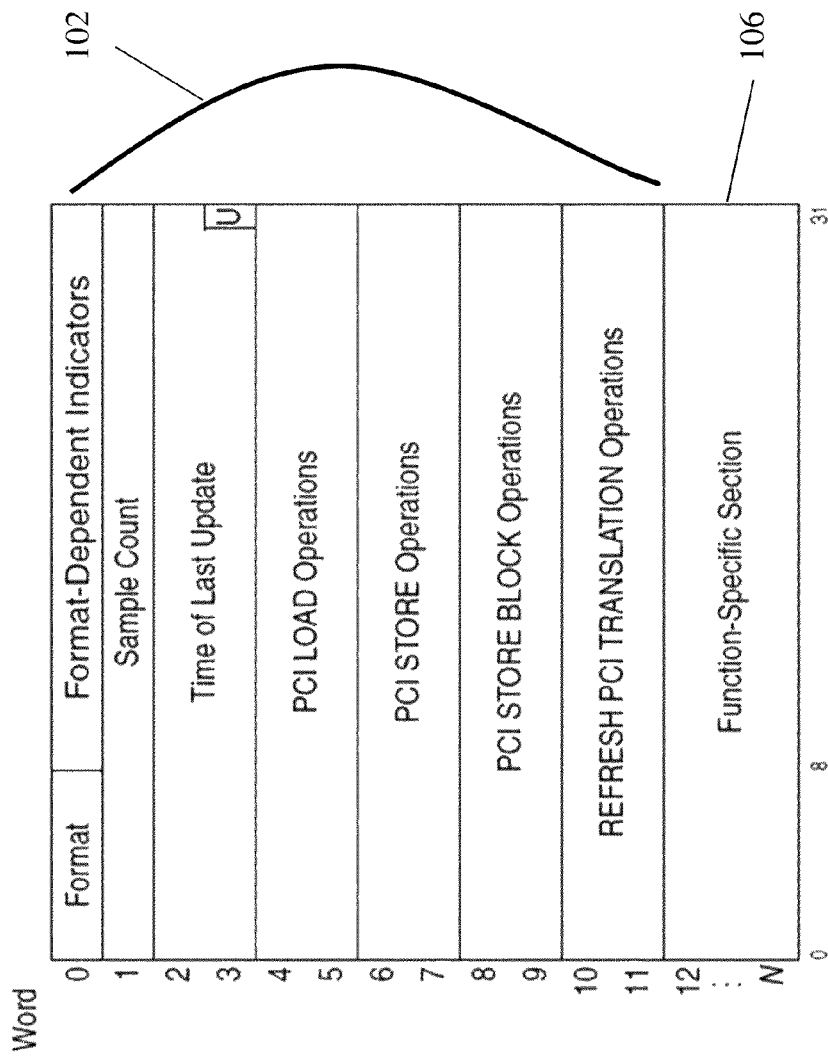
FIG. 1 depicts a function measurement block (FMB) in accordance with an embodiment.

Referring to FIG. 1, the PCI FMB is defined to contain two sections of information: (1) a common section 102, and (2) a function-dependent or function-specific section 106. The common section 102 and/or the function-dependent section 106 may be organized as words, wherein a word may include a number of bits (e.g., 32 bits, sometimes referred to as a long word and labeled as bits 0 through 31 in FIG. 1). As shown in FIG. 1, each word may be referenced by a position, address, or index. For illustrative simplicity, in FIG. 1 the words are referenced by indices 1 through N, where N is indicative of the number of words (or the number of words plus one, given that the first word is labeled as word 0).

In FIG. 1, the common section 102 contains the format (word 0), sample count (word 1), time of last update (words 2-3), update-in-progress (bit 31 of word 3), PCI-load operations (words 4-5), PCI-store operations (words 6-7), PCI-store-block operations (words 8-9), and refresh-PCI-translations operations fields (words 10-11). The common section 102 may contain certain function-dependent indications (word 0), such as a validity indication.

The function-dependent section 106 referenced above immediately follows the common section 102 in some embodiments. The content of the function-dependent section 106 depends on the format of the FMB, which is indicated by the format field (word 0). In some embodiments, the format field may be one of three types or values, denoted below as format 0, format 1, and format 2 for illustrative simplicity. The format type may be indicated in a format field of the FMB as described below. The format type/field may be reflective of a function associated with an adapter.

Figure 2:
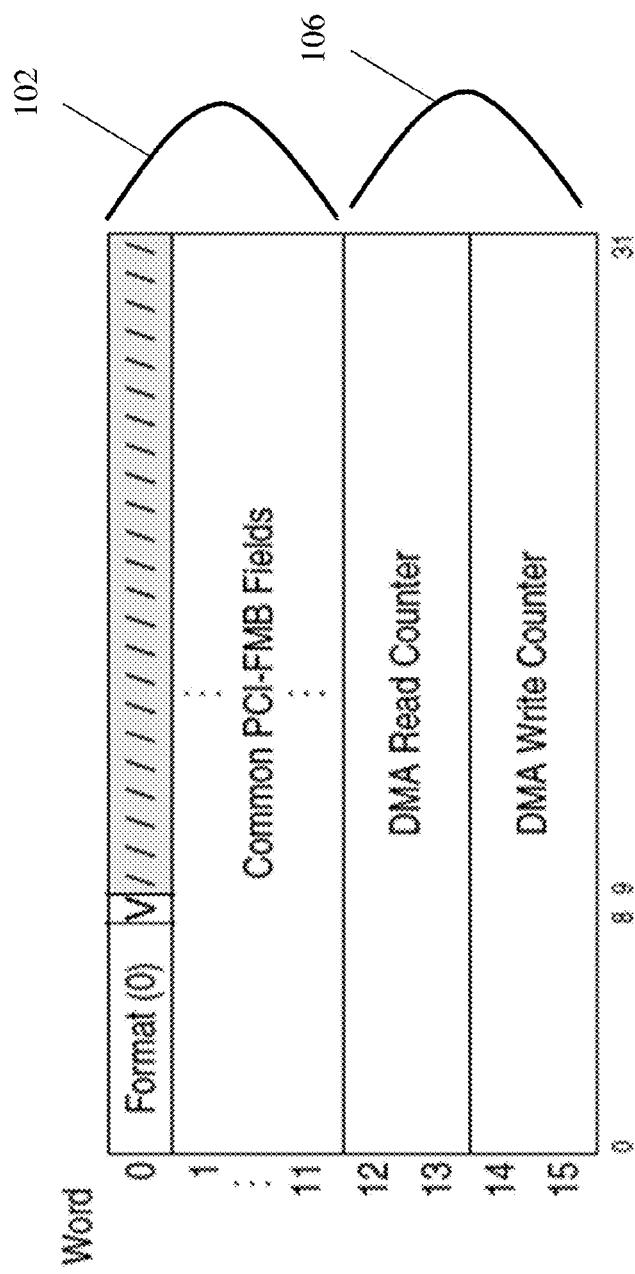
FIG. 2 depicts a FMB in a first format in accordance with an embodiment.

Referring to FIG. 2, an example of the PCI FMB for type format 0 is shown. The type format 0 may correspond to an unclassified PCI function. Bits 0-7 of the format (0) field in word 0 may contain a value of zero. As the format field in the original definition was always zero, compatibility with existing unclassified PCI functions is retained. Bits 9-31 of word 0 may be reserved and stored as zeroes.

Still referring to FIG. 2, the validity indication (denoted as 'V' in bit position 8 of word 0) is contained in the common section 102. The function-dependent section 106 contains a DMA read counter (words 12-13) and a DMA write counter (words 14-15). The DMA read counter may correspond to an unsigned 64-bit integer that is incremented by the number of bytes transferred to the PCI function from main storage by all DMA reads occurring during an update interval. The DMA write counter may correspond to an unsigned 64-bit integer that is incremented by the number of bytes transferred from the PCI function to main storage by all DMA writes occurring during the update interval. The values in the DMA read counter and the DMA write counter may represent the total number of bytes read or written, respectively, for all DMA address spaces associated with the PCI function.

In terms of programming, the PCI function may perform DMA reads and writes between a main storage and the function in blocks, the size of which is dependent on the PCI function and the PCI facility. Thus, the updating of the counters may appear to occur in block-sized increments as observed by the program. If a DMA read or write transfers fewer than the model-dependent block-size number of bytes, the respective read or write counter may be incremented by a full block size.

In some instances, the DMA read and write counters provided may be less than the number of PCI functions for which FMBs have been set or established. When the DMA-counter-validity bit (bit number 8 of word 0) is one, it indicates that hardware counters have been associated with the FMB.

The apportionment of the DMA counters to specific PCI functions may be based on one or more model-dependent parameters.

Figure 3:
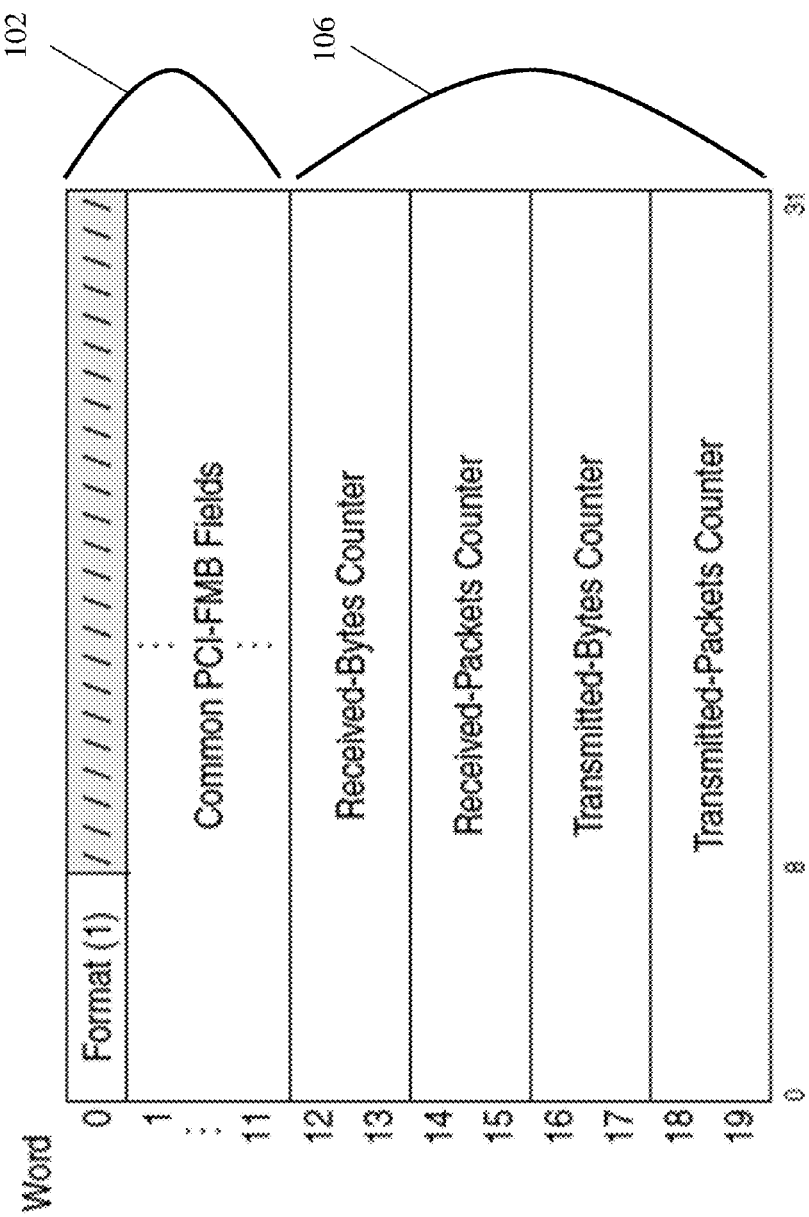
FIG. 3 depicts a FMB in a second format in accordance with an embodiment.

Referring to FIG. 3, an example of the PCI FMB for type format 1 is shown. The type format 1 may correspond to a networking type of PCI function. Bits 0-7 of the format (1) field in word 0 may contain a value of one. Bits 8-31 of word 0 may be reserved and stored as zeroes.

Still referring to FIG. 3, the function-dependent section 106 contains counters. Those counters may include one or more of: (1) a "received-bytes counter" (words 12-13) that is an unsigned 64-bit binary integer that is incremented by the number of bytes received on the external ethernet interface during the update interval, (2) a "received-packets counter" (words 14-15) that is an unsigned 64-bit binary integer that is incremented by the number of packets received on the external ethernet interface during the update interval, (3) a "transmitted-bytes counter" (words 16-17) that is an unsigned 64-bit binary integer that is incremented by the number of bytes transmitted on the external ethernet interface during the update interval, and (4) a "transmitted-packets counter" (words 18-19) that is an unsigned 64-bit binary integer that is incremented by the number of packets transmitted on the external ethernet interface during the update interval.

Figure 4:
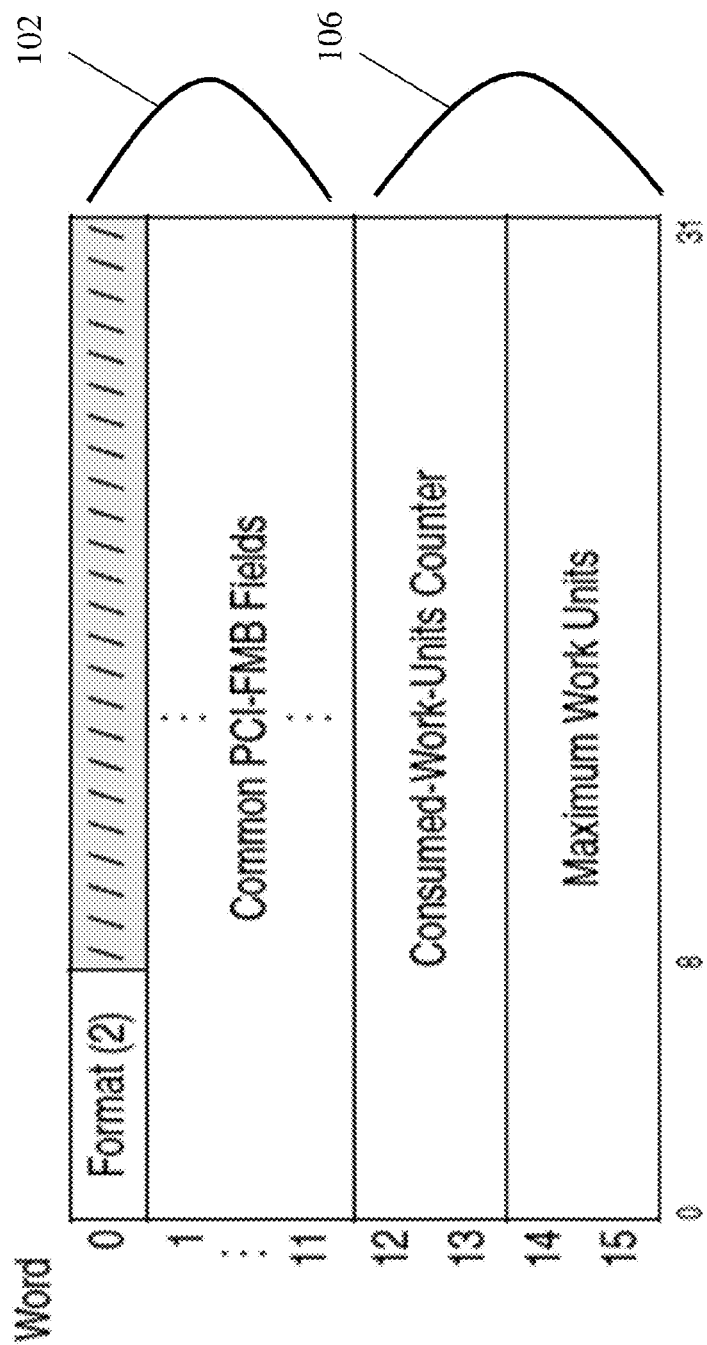
FIG. 4 depicts a FMB in a third format in accordance with an embodiment.

Referring to FIG. 4, an example of the PCI FMB for type format 2 is shown. The type format 2 may correspond for example to a zEnterprise-data-compression (zEDC) function. Bits 0-7 of the format (2) field in word 0 may contain a value of two. Bits 8-31 of word 0 may be reserved and stored as zeroes.

Still referring to FIG. 4, the function-dependent section 106 contains counters. Those counters may include one or more of: (1) a "consumed work units counter" (words 12-13) that is an unsigned 64-bit integer that is incremented by the number of work units processed by the PCI function during the update interval, and (2) a "maximum work units counter" (words 14-15) that is an unsigned 64-bit integer representing the maximum number of work units that the PCI function is capable of processing over a given time period (e.g., per second). In some embodiments the "maximum work units counter" may be relatively static and may be more appropriately contained in a call logical processor (CLP) query-PCI-function response. The CLP query-PCI-function response may be used in conjunction with communication to control or execute various controlling functions.

In terms of programming, to ensure that programs written to use values from a PCI FMB are executed properly, the program may initialize all fields of the FMB to a known value (e.g., zeroes) prior to setting the PCI function measurement parameters. In some embodiments, such initialization or setting may be based on a "modify PCI function controls" instruction with an operation control of ten.

When PCI function measurement is enabled, a program may only inspect the contents of the FMB. Program alteration of the FMB while PCI function measurement is active may yield unpredictable results.

The PCI FMB may be periodically updated and provide a snapshot of various counters at a particular instant. The counters may not precisely reflect the number of actual operations that have occurred at any moment. The interval at which the PCI FMB is updated may be reported in the measurement-block-update interval (MUI) field in the response to a query-PCI-function-group CLP command.

The FMB address may be fetched once during an update (e.g., a periodic update) to the FMB. When the "modify PCI function controls" (MPCIFC) instruction with an operation control often is used to change the FMB address, and the z/PCI facility is simultaneously updating counters, all of the updates for a period may occur either in the FMB that existed prior to the MPCIFC or in the FMB following the MPCIFC.

When the "modify PCI function controls" instruction with an operation control often is used to change the FMB address or to disable measurement, any FMB updates that were in progress at the time of the MPCIFC instruction may continue following the completion of the instruction, using the old FMB location. To ensure that updates to the block are completed, the program should wait for at least the interval reported in the MUI field in the response to the query-PCI-function-group CLP command, before reusing the block.

Figure 5:
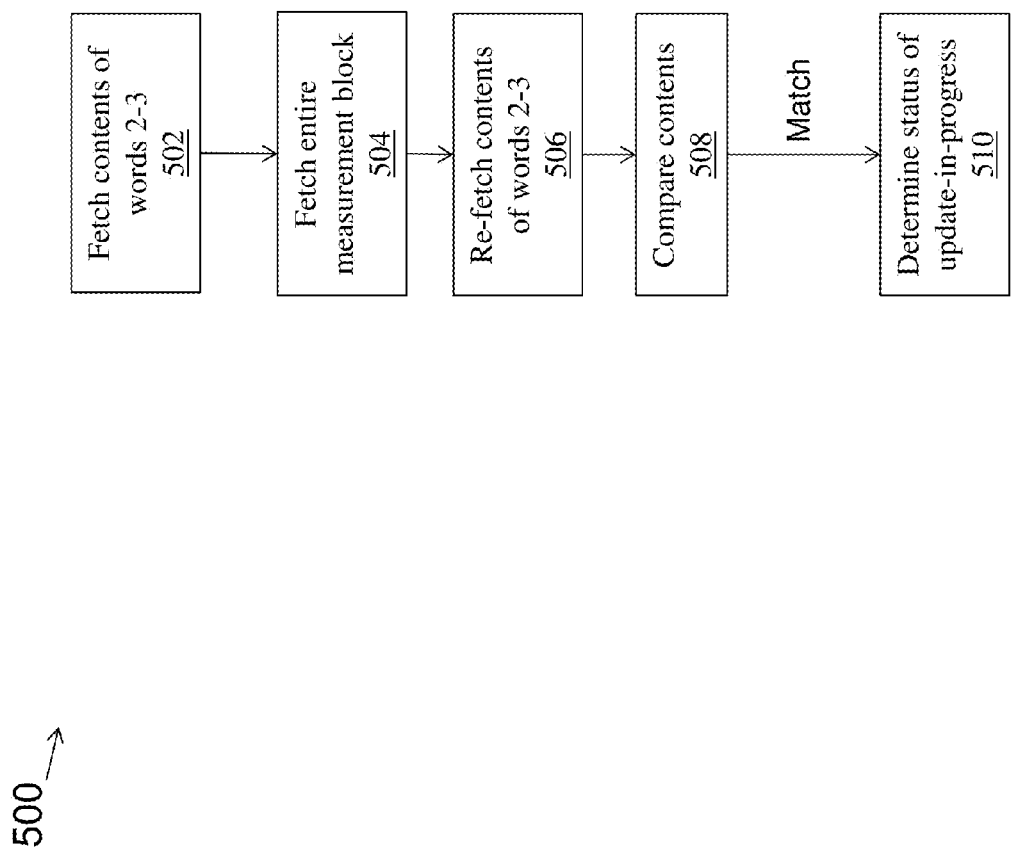
FIG. 5 depicts a process flow for determining whether a concurrent block of measurement information is observed in accordance with an embodiment.

Referring to FIG. 5, a flow chart of a method 500 is shown. The method 500 may be executed in order to ensure that a program observes a concurrent block of measurement information (e.g., to ensure that a block update did not occur while the block was being inspected).

In block 502, the contents of words 2 and 3 may be fetched.

In block 504, the entire measurement block may be fetched.

In block 506, the contents of words 2 and 3 may be re-fetched.

In block 508, a comparison between the contents of words 2 and 3 from block 502 may be made relative to the contents of words 2 and 3 from block 506. If the comparison indicates a match, flow may proceed from block 508 to block 510. On the other hand, if the comparison indicates no match, an update has been made during the observation and the method 500 may end.

In block 510, a determination may be made regarding the status of the update-in-progress field (bit 31 of word 3). If the update-in-progress field is a zero (e.g., a condition of no update is in progress), then no update occurred during the observation. Otherwise, if the update-in-progress filed is a one an update has been made during the observation.

Figure 6:
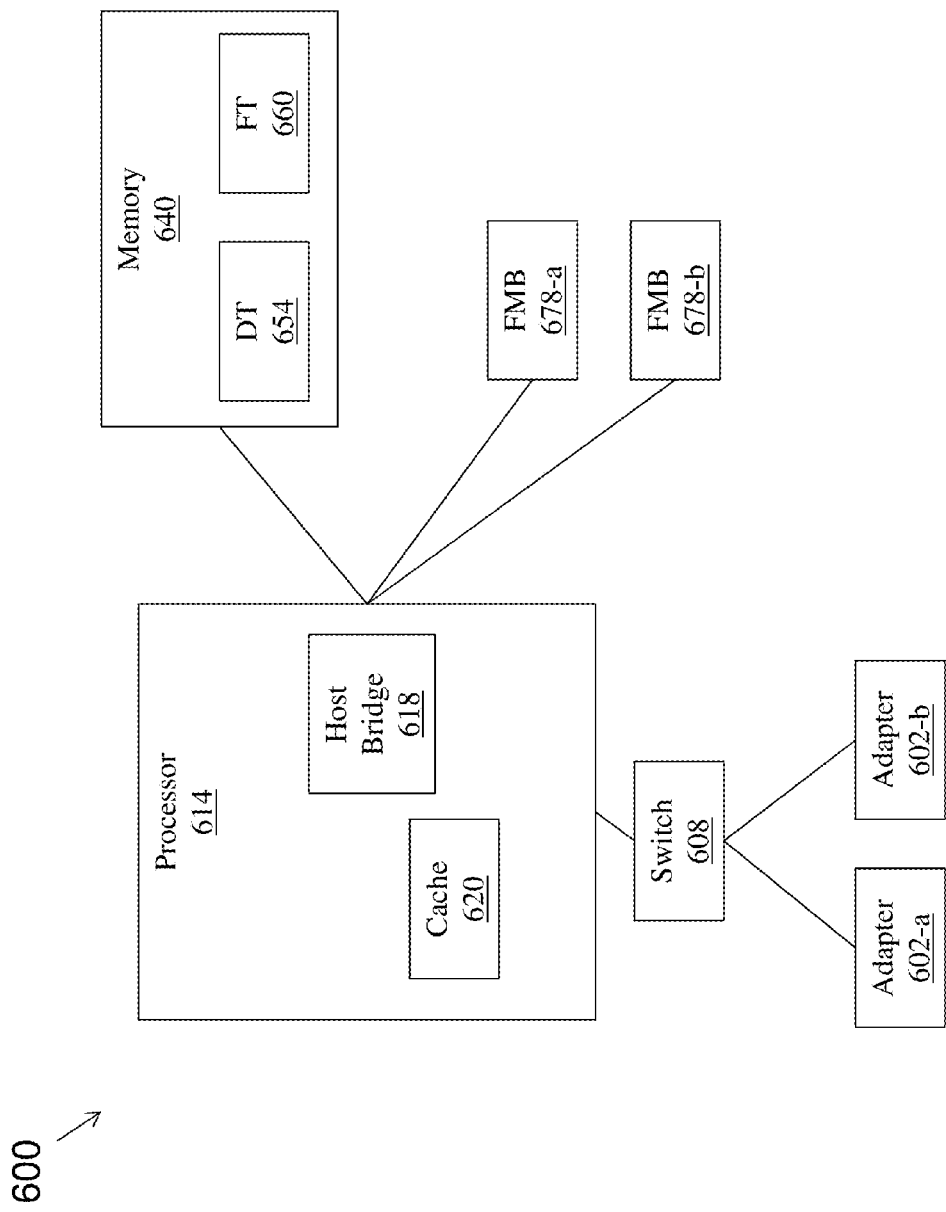
FIG. 6 depicts a system architecture in accordance with an embodiment.

Referring to FIG. 6, a system 600 is shown. The system 600 may include a number of adapters, such as adapters 602-a and 602-b. Adapter 602-a may be associated with a first PCI function (e.g., a networking function) and adapter 602-b may be associated with a second PCI function (e.g., a compression function).

The adapters 602-a and 602-b may be coupled to a switch 608. Switch 608 may include a PCI switch. The adapters 602-a and 602-b may communicate with the switch over PCI.

The switch 608 may be coupled to one or more processors, such as a processor 614. In some embodiments, the processor 614 may include a zProcessor provided by the International Business Machines Corporation. The processor 614 may include a host bridge 618, which may be used to interface the processor 614 with a PCI bus.

The processor 614 may include a cache 620. The cache 620 may include information that may be used to access memory, such as system memory 640. If a request (e.g., a read and/or write operation) associated with one of the adapters 602 is referenced in the cache 620 (a so-called cache hit), then the access to memory by the processor 614 may be facilitated using the cache 620. Otherwise, if the request is not referenced in the cache 620 (a so-called cache miss), then the access to memory by the processor 614 may be facilitated by consulting a device table (DT) 654.

The DT 654 may include a number of entries, referred to as device table entries (DTEs). The DTEs may include a starting and ending address for a portion of memory, such that any access requests by the adapters may be referenced to a particular portion of memory bounded by the starting and ending addresses. The DTEs may also provide support for any address translation that may be used. A particular DTE may be selected based on address information or other parameters associated with the request from the adapter 602. Once an appropriate DTE is selected, information associated with that DTE may be stored in the cache 620 in an effort to facilitate future cache hits in connection with the request.

The memory 640 may include a function table (FT) 660. The FT may include a number of entries, referred to as function table entries (FTEs). An FTE may exist for each PCI function that is supported. An FTE may store information or data pertaining to: (1) instruction counts, and (2) physical parameters (e.g., ports, byte counters, error counters, etc.). The physical parameters may be obtained from the adapters 602. The memory 640 may be managed by firmware in some embodiments.

The system 600 may include one or more FMBs, such as FMB 678-a and FMB 678-b. In an embodiment, the FMB 678-a may be associated with the adapter 602-a and the FMB 678-b may be associated with the adapter 602-b.

When a PCI request is received by the processor 614, the processor may access the cache 620 and/or the DT 654 to determine an appropriate memory address to access. Information pertaining to that access may be stored in the FT 660. The FMBs 678 may be updated periodically by system firmware based on instruction counts stored in the FT 660, or adapter-specific counts retrieved by system firmware from the adapter.

The system 600 is illustrative. In some embodiments, one or more of the devices or components may be optional. In some embodiments, additional components or devices not shown may be included. In some embodiments, the components or devices may be arranged in a manner that is different from what is shown in FIG. 6. For example, in some embodiments the FMBs 678-a and 678-b may be merged, or included, in the memory 640 and/or the processor 614.

Figure 7:
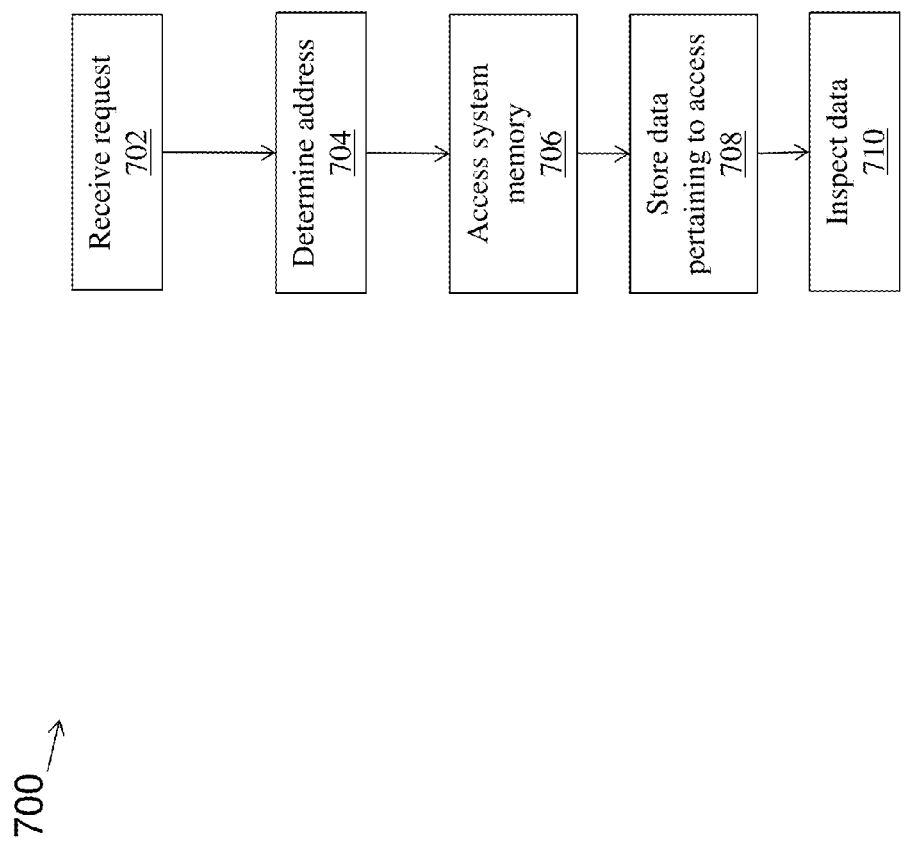
FIG. 7 depicts a process flow for interpreting data using an FMB in accordance with an embodiment.

Turning now to FIG. 7, a flow chart of a method 700 is shown. The method 700 may be executed in order to interpret data using an FMB.

In block 702, a request may be received. The request may correspond to a request originating from one or more adapters, such as a PCI adapter.

In block 704, the request may be analyzed to determine an address or address range to access in system memory. The address may be based on address information or address parameters included in the request.

In block 706, the system memory may be accessed in accordance with any operations included in or referenced by the request.

In block 708, information or data pertaining to the access may be stored. For example, one or more counters associated with an adapter or function may be incremented based on the access of block 706.

In block 710, the information or data associated with block 708 may be interrogated or inspected. The data may be interpreted based on a value associated with one or more fields, such as a format field.

Figure 8:
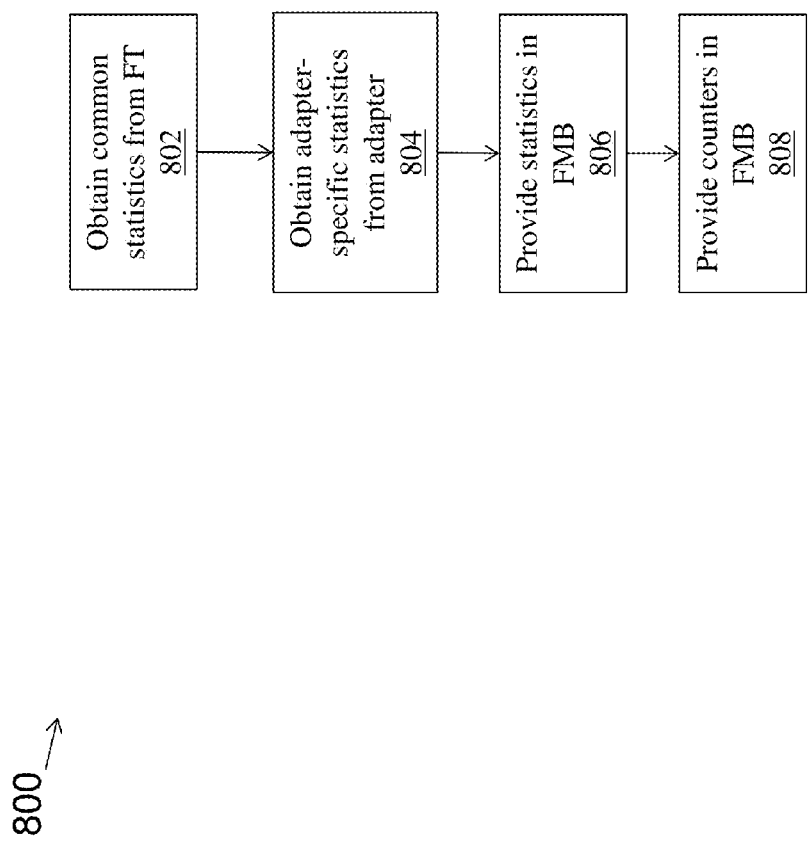
FIG. 8 depicts a process flow for interpreting data using an FMB in accordance with an embodiment.

Turning now to FIG. 8, a flow chart of a method 800 is shown. The method 800 may be executed in order to interpret data using an FMB. One or more of the operations described below may be performed by, or executed by, system firmware or a processor.

In block 802, common statistics may be obtained from a function table (FT). Common statistics may include a number of PCI load, PCI Store, PCI Store Block or RPCIT instructions executed during a sample period.

In block 804, adapter-specific statistics may be obtained from one or more adapters. Adapter-specific statistics may include receive byte counts, receive packet counts, transmitted byte counts, transmitted packet counts, or consumed work unit counts.

In block 806, the statistics obtained in block 802 and/or block 804 may be provided to an FMB. Providing the statistics in an FMB may facilitate access to the statistics by an Operating System (OS).

In block 808, one or more counters may be provided in the FMB. A counter may be specific to an adapter. For example, the specific type may be based on a PCI function type.

Technical effects and benefits include the enhancement of a FMB. Data inspected by or associated with the FMB may be more meaningful with respect to an adapter itself. Moreover, the interpretation of the function-dependent section based on a format field of the FMB may allow for scalability to support numerous adapter or function types.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for enhancing a function measurement block, the method comprising:
   obtaining, by a processor, common statistics from a function table;
   obtaining, by the processor, adapter-specific statistics from an adapter;
   providing, by the processor, the common statistics and the adapter-specific statistics in the function measurement block; and
   providing adapter-specific counters in the function measurement block,
   wherein a PCI function type associated with the adapter is reflected in a format field of the function measurement block, the format field having a first value, and a section of the function measurement block is associated with a direct memory access read counter and a direct memory access write counter.

2. The method of claim 1, wherein when the format field has a second value, a section of the function measurement block is associated with a received bytes counter, a received packets counter, a transmitted bytes counter, and a transmitted packets counter.

3. The method of claim 1, wherein when the format field has a third value, a section of the function measurement block is associated with a consumed work units counter and a maximum work units counter.

4. The method of claim 1, further comprising:
   receiving, by the processor, a request from the adapter over peripheral component interconnect (PCI).

5. The method of claim 4, further comprising:
   determining, by the processor, an address in a memory based on the request and based on the use of a cache.

6. A computer program product for enhancing a function measurement block, the computer program product comprising:
   a computer readable storage medium having program instructions embodied therewith, the program instructions readable by a processing circuit to cause the processing circuit to perform a method comprising:
   obtaining, by a processor, common statistics from a function table;
   obtaining, by the processor, adapter-specific statistics from an adapter;
   providing, by the processor, the common statistics and the adapter-specific statistics in the function measurement block; and
   providing adapter-specific counters in the function measurement block,
   wherein a PCI function type associated with the adapter is reflected in a format field of the function measurement block, the format field having a first value, and a section of the function measurement block is associated with a direct memory access read counter and a direct memory access write counter.

7. The computer program product of claim 6, wherein when the format field has a first value, a section of the function measurement block is associated with a received bytes counter, a received packets counter, a transmitted bytes counter, and a transmitted packets counter.

8. The computer program product of claim 6, wherein when the format field has a first value, a section of the function measurement block is associated with a consumed work units counter and a maximum work units counter.

9. The computer program product of claim 6, wherein the method further comprises:
   receiving, by the processor, a request from the adapter over peripheral component interconnect (PCI).

10. The computer program product of claim 9, wherein the method further comprises:
    determining, by the processor, an address in a memory based on the request and based on the use of a cache.

11. The computer program product of claim 6, wherein the common statistics comprise at least one of: a number of peripheral component interconnect (PCI) load, PCI Store, PCI Store Block and RPCIT instructions executed during a sample period, and wherein the adapter-specific statistics comprise at least one of: receive byte counts, receive packet counts, transmitted byte counts, transmitted packet counts, and consumed work unit counts.

12. A computer program product for enhancing a function measurement block, the computer program product comprising:
    a computer readable storage medium having program instructions embodied therewith, the program instructions readable by a processing circuit to cause the processing circuit to perform a method comprising:
    obtaining, by a processor, common statistics from a function table;
    obtaining, by the processor, adapter-specific statistics from an adapter;
    providing, by the processor, the common statistics and the adapter-specific statistics in the function measurement block; and
    providing adapter-specific counters in the function measurement block,
    wherein the common statistics comprise at least one of: a number of peripheral component interconnect (PCI) load, PCI Store, PCI Store Block and RPCIT instructions executed during a sample period, and wherein the adapter-specific statistics comprise at least one of: receive byte counts, receive packet counts, transmitted byte counts, transmitted packet counts, and consumed work unit counts.

* * * * *